United States Patent [19]
Ohya et al.

[11] Patent Number: 5,453,867
[45] Date of Patent: Sep. 26, 1995

[54] ANALOG OPTICAL TRANSMISSION SYSTEM

[75] Inventors: Jun Ohya, Osaka; Toshihiro Fujita, Minoo; Hisanao Sato, Ibaragi, all of Japan

[73] Assignee: Matsushita Electric Industrial Co., Ltd., Japan

[21] Appl. No.: 107,997

[22] Filed: Aug. 18, 1993

[30] Foreign Application Priority Data

Aug. 31, 1992 [JP] Japan .................................. 4-230882

[51] Int. Cl.$^6$ .................................................. H04B 10/00
[52] U.S. Cl. ........................... 359/161; 359/160; 359/341
[58] Field of Search ........................... 359/134, 160–161, 359/173, 179, 181–183, 154, 341, 125, 132, 188, 195; 372/6

[56] References Cited

U.S. PATENT DOCUMENTS

| | | | |
|---|---|---|---|
| 5,210,631 | 5/1993 | Huber et al. | 359/132 |
| 5,222,089 | 6/1993 | Huber | 372/6 |
| 5,303,079 | 4/1994 | Gnauck et al. | 359/188 |

OTHER PUBLICATIONS

Way et al., "Multichannel AM–VSB Television Signal Transmission Using an Erbium–Doped Optical Fiber Power Amplifier", IEEE Photonics Technology Letters, vol. 1, No. 10, Oct. 1989, pp. 343–345.

*Primary Examiner*—David K. Moore
*Assistant Examiner*—Kinfe-Michael Negash
*Attorney, Agent, or Firm*—Parkhurst, Wendel & Rossi

[57] ABSTRACT

An analog transmission system for transmitting a multi-channel analog signal including plural carrier signals having different frequencies, comprises: a laser unit responsive to the multi-channel analog signal for emitting laser light signal intensity-modulated by the multi-channel analog signal, the laser unit having an oscillation wavelength W1; an optical fiber amplifier for amplifying the laser light signal with a peak gain at a wavelength W2; an optical fiber for transmitting the amplified laser light; and an optical receiver for receiving the transmitted laser light and for converting the received laser light into an electric signal as an output. In this system, a total distortion characteristic of the laser unit is compensated by distortions developed in the optical fiber amplifier.

20 Claims, 11 Drawing Sheets

ANALOG OPTICAL TRANSMISSION SYSTEM

BACKGROUND OF THE INVENTION

1. Field of the Invention

This invention relates to an analog optical transmission system for transmitting a light signal.

2. Description of the Prior Art

An analog optical transmission system, having an optical fiber amplifier, for transmitting a light signal having an wavelength of 1550 nm band is known. FIG. 8 is a block diagram of such a prior art analog optical transmission system. A DFB (distributed feedback) laser 7 emits a laser light having a wavelength of 1550 nm band. The laser light is intensity-modulated by an analog signal modulated by AM-FDM (amplitude modulation with frequency division multiplex) or FM-FDM (frequency modulation with frequency division multiplex) as a laser light signal. The emitted laser light signal is amplified by an optical fiber amplifier 8 having an Er-doped optical fiber and a semiconductor laser for emitting laser light having a wavelength of 1480 nm for excitation of the Er-doped optical fiber. The amplified laser light signal is transmitted through a single mode optical fiber 9 having a length of 10 km. The transmitted laser light signal is received by an optical receiving unit 10. The optical receiving unit 10 converts the received laser light into an electric signal. Since the optical fiber amplifier 8 has a high gain at the 1550 nm band, it can be used as an booster amplifier. Therefore, this optical transmission system provides an optical distribution system for distributing video signals of more than a hundred of channels from a source to customers through all optical elements.

As mentioned, the intensity-modulation of the laser light signal emitted from the semiconductor laser also causes a frequency modulation of the emitted laser light signal. Moreover, the optical fiber amplifier 8 has a high gain at the 1550 nm band. However, the optical fiber amplifier 8 has a wavelength-dependency (frequency-dependency). Therefore, when the laser light signal subjected to frequency modulation as well as intensity modulation is transmitted through the optical fiber amplifier 8 having the frequency dependency, a secondary intermodulation component is developed by an interaction between the frequency modulated component and the frequency dependency in gain, so that the intensity modulated laser light signal is largely distorted. That is, in the prior art analog optical transmission system, there is a problem that the optical fiber amplifier 8 used for amplifying the laser light signal generates a large amount of distortion.

SUMMARY OF THE INVENTION

The present invention has been developed in order to remove the above-described drawbacks inherent to the conventional analog optical transmission system.

According to the present invention there is provided a first analog transmission system for transmitting a multi-channel analog signal including plural carrier signals having different frequencies, comprises: a laser unit responsive to the multi-channel analog signal for emitting laser light signal intensity-modulated by the multi-channel analog signal, the laser unit having an oscillation wavelength W1; an optical fiber amplifier for amplifying the laser light signal; an optical fiber for transmitting the amplified laser light; and an optical receiver for receiving the transmitted laser light and for converting the received laser light into an electric signal as an output, wherein a distortion characteristic of the laser unit caused by first-and second carrier signals of the plural carrier signals is compensated by distortions developed in the optical fiber amplifier.

According to the present invention there is also provided a second analog transmission system for transmitting a multi-channel analog signal including plural carrier signals having different frequencies, comprising: a laser unit responsive to the multi-channel analog signal for emitting laser light signal intensity-modulated by the multi-channel analog signal, the laser unit having an oscillation wavelength W1; an optical fiber amplifier for amplifying the laser light signal with a peak gain at a wavelength W2; an optical fiber for transmitting the amplified laser light; and an optical receiver for receiving the transmitted laser light and for converting the received laser light into an electric signal as an output. In the second analog optical transmission system, a total distortion characteristic is compensated as follows:

First and second carrier signals of the plural carrier signal have frequencies fk and fj respectively. The laser light signal includes at least a secondary intermodulation distortion component of the frequencies fk and fj. The amplified laser light signal includes intensity-modulation components of the frequencies fk and fj and frequency modulation components of the frequencies fk and fj. Phases of the intensity-modulation components of the frequencies fk land fj are assumed as $\theta$ IMk and $\theta$ IMj respectively, phases of the frequency modulation components of the frequencies fk and fj as $\theta$ FMk and $\theta$ FMj respectively, and a phase of the secondary intermodulation distortion component as $\theta$ kj. $|(\theta$ IMk+$\theta$FMj+$\theta$ IMj+$\theta$ FMk)/2−$\theta$kj|<$\pi$/2 when W1<W2.

In the second analog transmission system, the total distortion characteristic may be improved when $|(\theta$ IMk+$\theta$ FMj+$\theta$ IMj+$\theta$ FMk)/2−$\theta$kj|≦$5\pi$/16.

In the second analog transmission system, W1 may be in 1550 nm band and the optical fiber amplifier has an exciter laser and an amplifying optical fiber for amplifying and transmitting the laser light signal, the amplifying optical fiber being doped with Er to amplify the laser light signal.

In the second analog transmission system W1 may be in 1300 nm band and the optical fiber amplifier has an exciter laser and an amplifying optical fiber for amplifying and transmitting the laser light signal, the amplifying optical fiber being doped with Pr to amplify the laser light signal.

In the second analog transmission system the optical fiber comprises a dispersion shifted optical fiber.

According to the present invention there is further provided a third analog transmission system for transmitting a multi-channel analog signal including plural carrier signals having different frequencies, comprising: a laser unit responsive to the multi-channel analog signal for emitting laser light signal intensity-modulated by the multi-channel analog signal, the laser unit having an oscillation wavelength W1; an optical fiber amplifier for amplifying the laser light signal with a peak gain at a wavelength W2; an optical fiber for transmitting the amplified laser light; and an optical receiver for receiving the transmitted laser light and for converting the received laser light into an electric signal as an output, first and second carrier signals of the plural carrier signals having frequencies fk and fj respectively, the laser light signal including at least a secondary intermodulation distortion component of the frequencies fk and fj, the amplified laser light signal including intensity-modulation components of the frequencies fk and fj and frequency modulation components of the frequencies fk and fj, phases of the intensity-modulation components of the frequencies fk and fj being θ IMk and θ IMj respectively, phases of the frequency modulation components of the frequencies fk and fj being θ FMk and θ FMj respectively, a phase of the secondary intermodulation distortion component being θ kj, wherein $\pi/2 < |(\theta\ IMk + \theta\ FMj + \theta\ IMj + \theta\ FMk)/2 - \theta\ kj| \leq \pi$ when W1>W2.

In the third analog transmission system the optical fiber, the distortion characteristic is further improved when $11\pi/16 \leq |(\theta\ IMk + \theta FMj + \theta\ IMj + \theta\ FMk)/2 - \theta\ kj| \leq \pi$.

In the third analog transmission system, W1 may be in 1550 nm band and the optical fiber amplifier has an exciter laser and an amplifying optical fiber for amplifying and transmitting the laser light signal, the amplifying optical fibber being doped with Er to amplify the laser light signal.

In the third analog transmission system W1 may be in 1300 nm band and the optical fiber amplifier has an exciter laser and an amplifying optical fiber for amplifying and transmitting the laser light signal, the amplifying optical fiber being doped with Pr to amplify the laser light signal.

In the third analog transmission system the optical fiber comprises a dispersion shifted optical fiber.

First to third analog transmission systems may further comprises phase control means provided between the laser unit and the optical fiber amplifier for changing a phase difference of the secondary distortion component from the intensity-modulation components and frequency modulation components.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention with reference to drawings.

Figure 1:
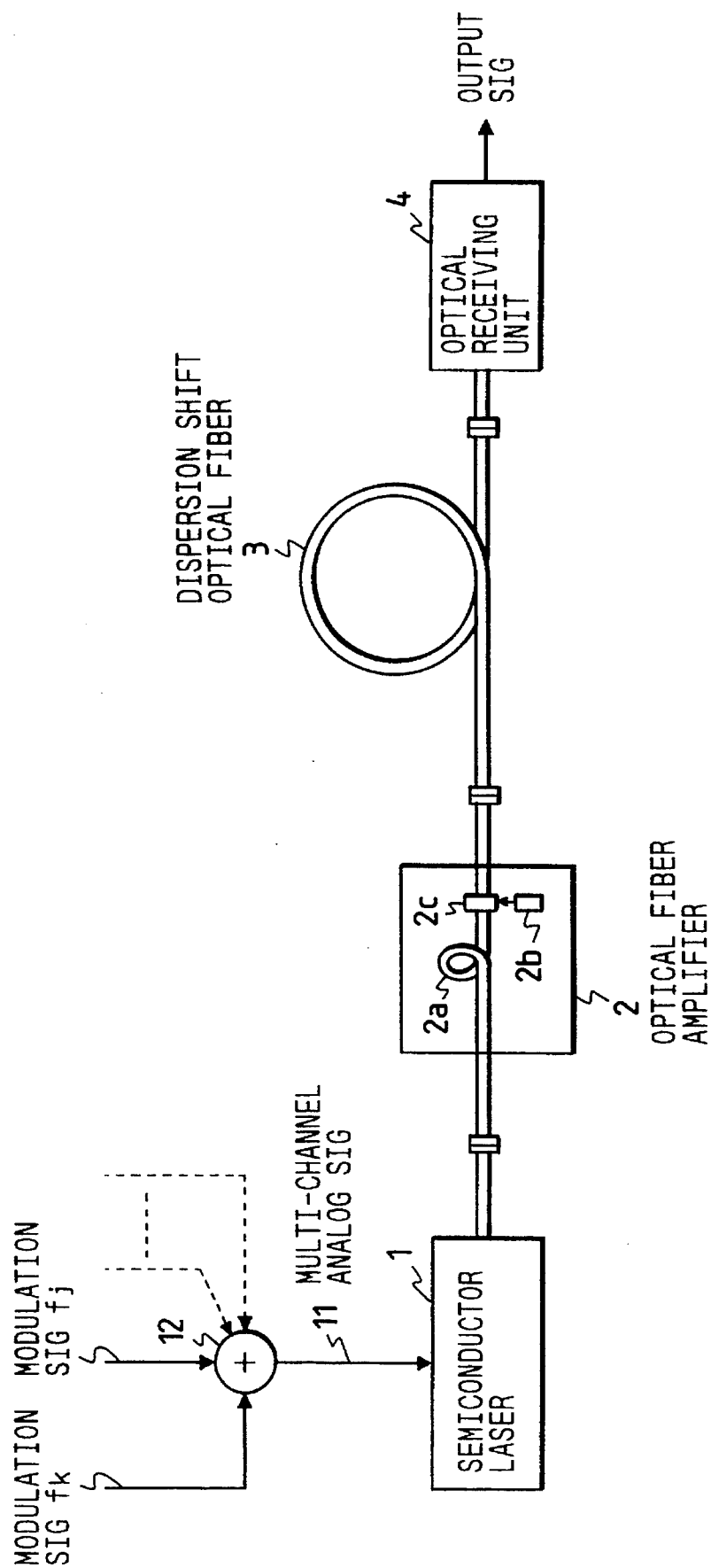
FIG. 1 is a block diagram of a first embodiment of this invention for showing an analog optical transmission system.

FIG. 1 is a block diagram of this embodiment of this invention for showing an analog optical transmission system.

A DFB (distributed feedback) type of semiconductor laser 1 emits laser light. A first example of the DFB laser 1 emits laser light having a wavelength of 1562 nm. A second example of the DFB laser 1 emits laser light having a wavelength of 1546 nm. The laser light is intensity-modulated as a laser light signal by a multi-channel analog signal 11 inputted to the semiconductor laser 1. The multi-channel analog signal is modulated by AM-FDM (amplitude modulation with frequency division multiplex) or FM-FDM (frequency modulation with frequency division multiplex). More specifically, plurality of modulation signals are added by an adder 12. The plurality of modulation signals includes first and second modulation (carrier) signals having frequencies fk and fj. The emitted laser light signal is amplified by an optical fiber amplifier 2 having Er-doped optical fiber 2a, a wavelength division multiplexer, and a semiconductor laser 2b for emitting laser light for excitation of the Er-doped optical fiber 2a. The semiconductor laser 2b has a different oscillation frequency from the semiconductor laser 1. the wavelength division multiplexer 2c transmits the laser light signal from the optical fiber 2a to the dispersion shifted optical fiber 3 and reflects and directs laser light from the semiconductor laser 2b toward the optical fiber 2b for excitation. The optical fiber amplifier 2 has a peak of gain at about 1556 nm. The amplified laser lights signal is transmitted through a dispersion shifted optical fiber 3. The transmitted laser light signal is received by an optical receiving unit 4. The optical receiving unit 4 converts the received laser light into an electric signal as an output signal.

In this optical transmission system, a distortion developed at the semiconductor laser 1 is reduced by transmitting the laser light signal through the optical fiber amplifier 2, namely, the distortions developed by the semiconductor laser 1 and the optical fiber amplifier 2 cancel each other. The dispersion shifted optical fiber 3 transmits the laser light signal without increase in distortion level.

Figure 2A:
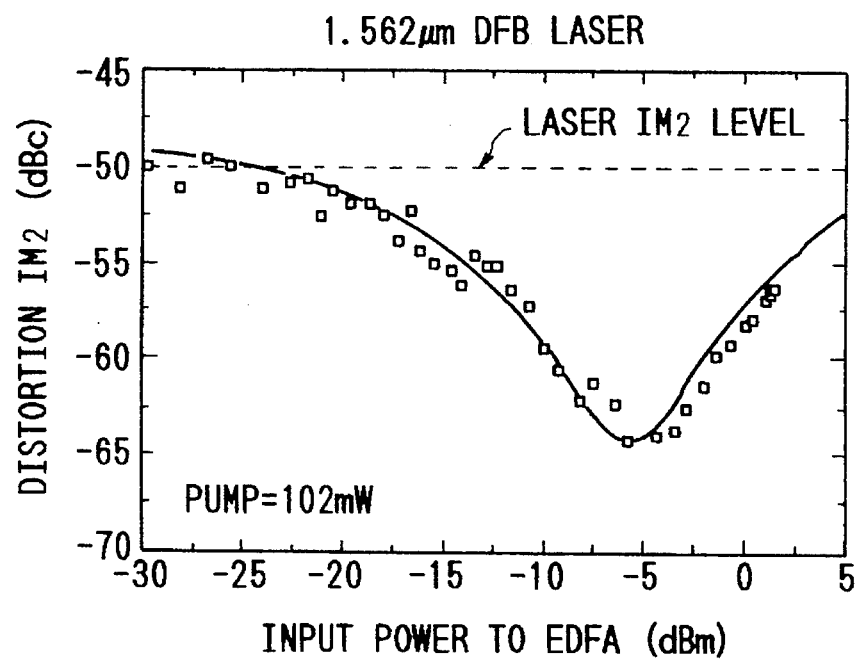
FIG. 2A is a graph showing an input power dependency of secondary intermodulation distortion between an input power to an optical fiber amplifier and distortion in the output of the optical fiber amplifier shown in FIG. 1 when a second example of the semiconductor laser is used.
Figure 2B:
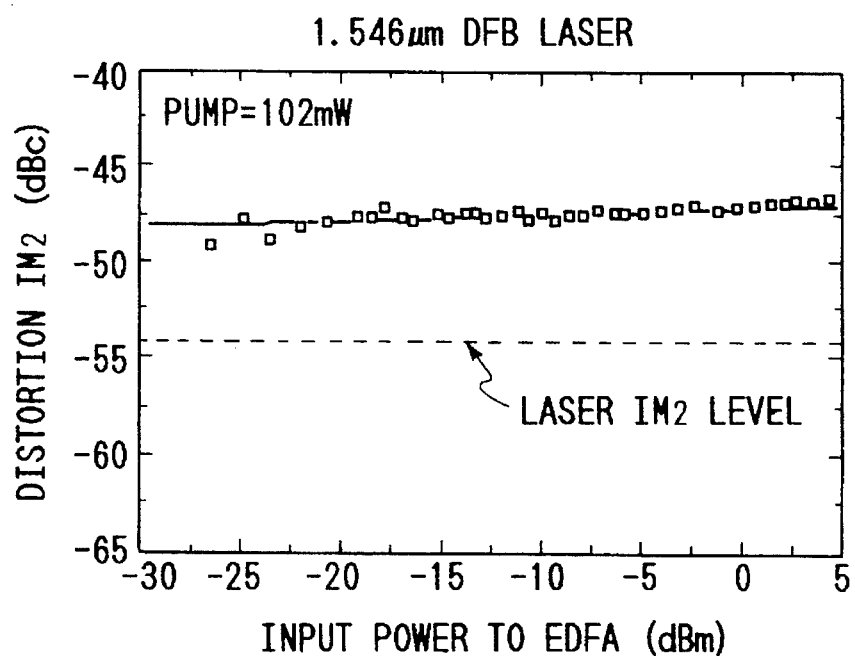
FIG. 2B is a graph showing an input power dependency of secondary intermodulation distortion between an input power to the optical fiber amplifier and distortion in the output of the optical fiber amplifier shown in FIG. 1 when a second example of the semiconductor laser is used.
Figure 3A:
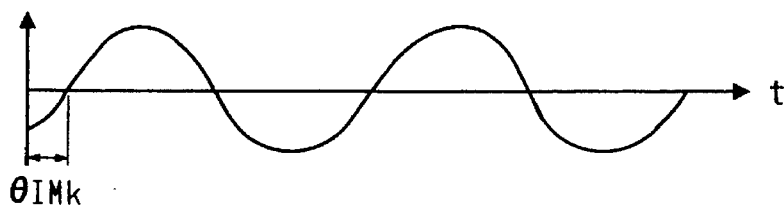
FIG. 3A is a graph of the first embodiment for showing a variation of an intensity modulation component of a frequency fk.
Figure 3B:
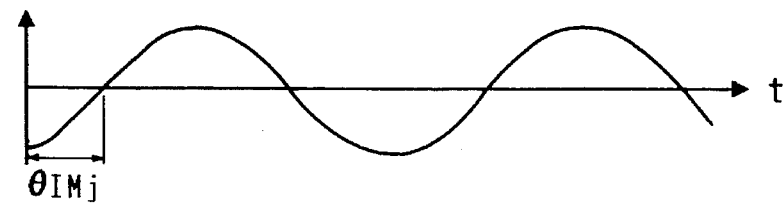
FIG. 3B is a graph of the first embodiment for showing a variation of an intensity modulation component of a frequency fj.
Figure 3C:
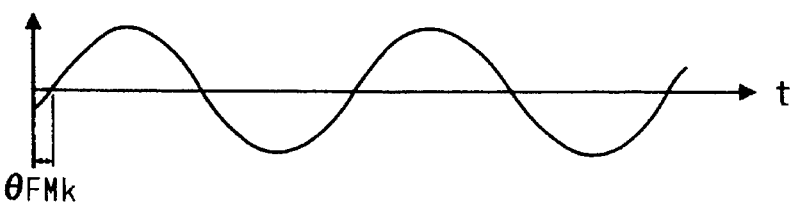
FIG. 3C is a graph of the first embodiment for showing a variation of a frequency modulation component of the frequency fk.
Figure 3D:
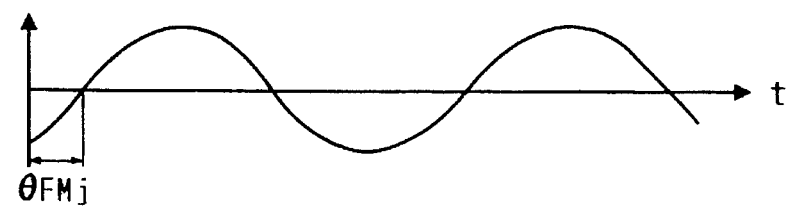
FIG. 3D is a graph of the first embodiment for showing a variation of a frequency modulation component of the frequency fj.
Figure 3E:
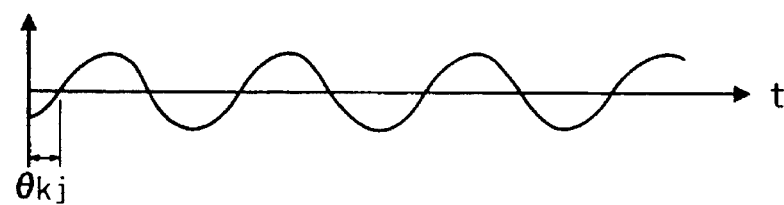
FIG. 3E is a graph of the first embodiment for showing a variation of a distortion component of the frequency fk+fj.

FIG. 2A is a graph showing an input power dependency of secondary intermodulation distortion between an input power to the optical fiber amplifier 2 and distortion in the output of the optical fiber amplifier 2 when the first example of the semiconductor laser 1 having the oscillation wavelength of 1562 nm and a secondary intermodulation distortion −50.5 dBc (laser $IM_2$ level) is used. FIG. 2B is a graph showing an input power dependency of secondary intermodulation distortion between an input power to the optical fiber amplifier 2 and distortion in the output of the optical fiber amplifier 2 when the second example of the semiconductor laser 1 having the oscillation wavelength of 1546 nm and a secondary intermodulation distortion −50.5 dBc (laser $IM_2$ level) is used. In both cases, modulation frequencies of the modulation signals are 950 MHz and 1050 MHz and the modulation factor is 20% per carrier.

In FIG. 2A, the distortion at the output of the optical fiber amplifier 2 is smaller than that of the output of the semiconductor laser 1 by about 15 dB. Therefore, the distortion in the laser light signal derived from the semiconductor laser 1 intensity-modulated by the multi-channel analog signal modulated at 950 MHz and 1050 MHz is reduced by passing of the laser light signal through the optical fiber amplifier 2 because in the prior art analog optical transmitting system, the distortion at the output of the optical fiber amplifier 8 was larger than that at the output of the semiconductor laser 7.

On the other hand, in the example as shown in FIG. 2B, the distortion at the output of the optical fiber amplifier 2 is larger than that at the output of the semiconductor laser 1, namely, the distortion at the output of the optical fiber amplifier 2 is added to that at the output of the semiconductor laser 1. Though the secondary intermodulation distortion level $IM_2$ of the second example of the semiconductor laser 1 as shown in FIG. 2B is lower than that of the second example as shown in FIG. 2A, the distortion level of the optical fiber amplifier 2 of the second example of FIG. 2B is higher than that of the example of FIG. 2A. That is the distortion level of the output of the optical fiber amplifier 2 is not dependent of the secondary intermodulation distortion level $IM_2$ of the semiconductor laser 1.

In the analog optical transmission system using the optical fiber amplifier 2, it was said that the secondary intermodulation distortion of the semiconductor laser 1 is increased by interaction between the frequency modulation component and the wavelength dependency of the gain of the optical fiber amplifier 2. However, as shown in FIGS. 2A and 2B, if the optical fiber amplifier 2 is used it is evident that there are two cases where the secondary intermodulation distortion increases and decreases.

The inventors had analysis to determine the condition in which the distortion is lowered in consideration of a dependency of propagation direction of the optical fiber 2a having the wavelength dependency of gain. As the result, the inventors found out that the secondary intermodulation distortion is canceled by the distortion developed in the optical fiber amplifier 2 while the signal light transmits through the optical fiber 2a and the distortion of the output of the optical fiber amplifier 2 is decreased under the distortion level at the output of the semiconductor laser 1. This will be further described below.

The distortion characteristic at the output of the optical fiber amplifier 2 depends on a phase relation among:
(A) intensity modulation component in the signal light of the semiconductor laser 1;
(B) frequency modulation component in the signal light of the semiconductor laser 1;
(C) distortion component in laser light of the semiconductor laser 1.

This is because the distortion developed in the optical fiber amplifier 2 is determined by the product of the intensity modulation component (A) and the frequency component (B). Therefore, if the product of (A) and (B) is in phase with the distortion component (C), the distortion level increases since these distortion levels are added in the optical fiber amplifier 2. On the other hand, the product of (A) and (B) is antiphase with the distortion component (C), these distortions cancel each other in the optical fiber amplifier 2.

Then, will be described the phase relation between the distortion components. It is assumed that: phases of intensity modulation components (IM) of the modulation frequencies fk and fj are θ Mk and θ IMj respectively; phases of frequency modulation components (FM) of the modulation frequencies fk and fj are θ FMk and θ FMj respectively; and the phase of the secondary intermodulation distortion component is θ kj. Then, variations of respective components are as shown in FIGS. 3A to 3E and they show phase relations therebetween.

Here, a phase difference Δθ between the distortion component of the optical fiber amplifier 2 and the distortion component (C) of the semiconductor laser 1 is given by:

$$\Delta\theta = |(\theta IMk + \theta FMj + \theta IMj + \theta FMk)/2 - \theta kg| \quad (1)$$

wherein Δθ ranges from 0 to π.

Figure 4:
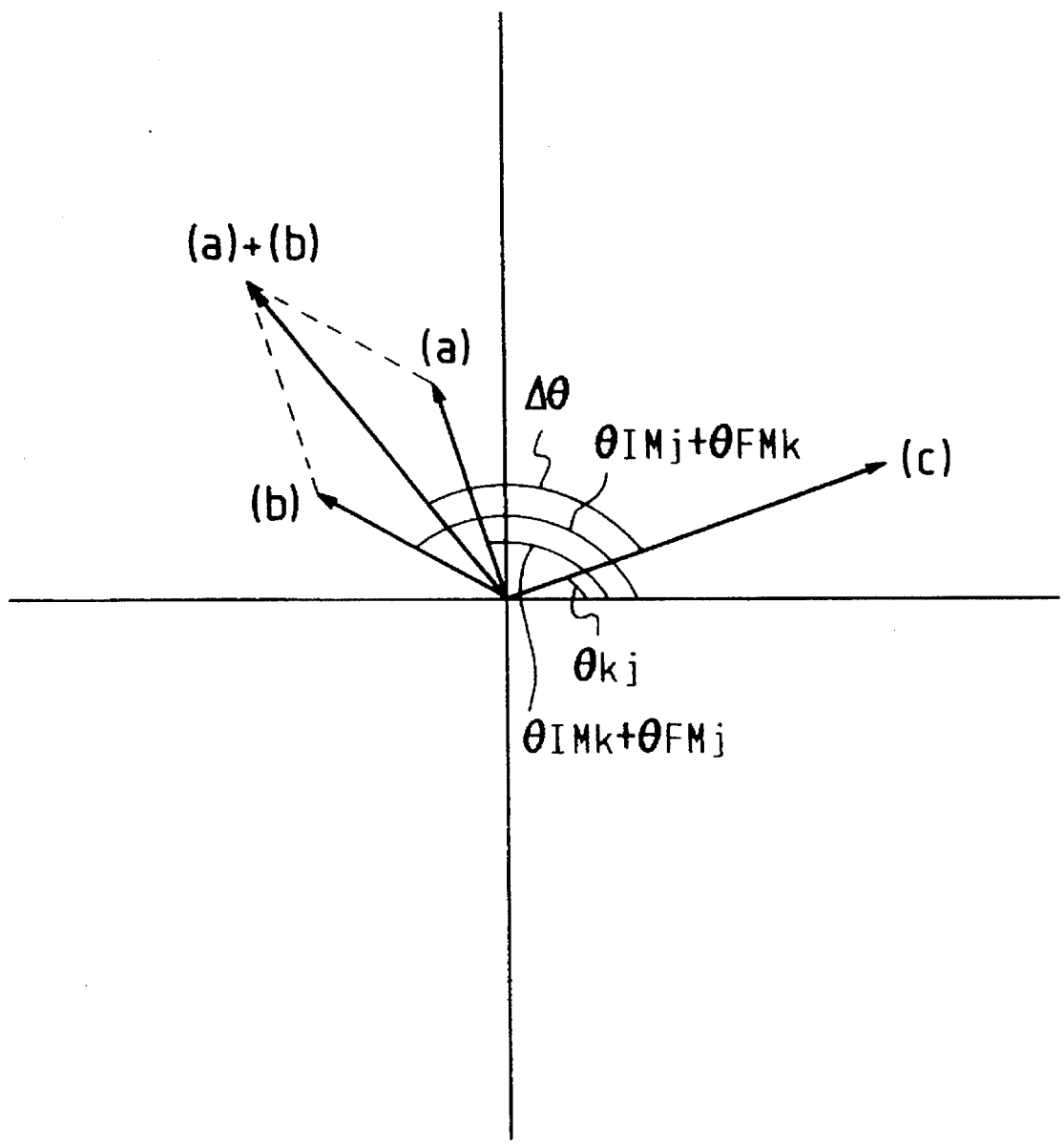
FIG. 4 is a vector diagram of the first embodiment for showing a phase relation of distortion components developed in the optical fiber amplifier shown in FIG. 1.

Then, it is described that A θ is represented by EQ. (1) with reference to FIG. 4. FIG. 4 is a vector diagram of the first embodiment for showing the phase relation of distortion components developed in the optical fiber amplifier 2.

The secondary intermodulation distortion component of frequencies of fk+fj developed in the optical fiber amplifier 2 is a sum of distortions of:
(a) a product of an intensity modulation component of the frequency fk and a frequency modulation component of the frequency fj; and
(b) a product of an intensity modulation component of the frequency fj and a frequency modulation component of the frequency fk.

A phase of the distortion component (a) is given by:

$$\theta IMk + \theta FMj \quad (2)$$

A phase of the distortion component (b) is given by:

$$\theta IMj + \theta FMk \quad (3)$$

FIG. 4 shows vectors (a), (b), (a)+(b), and (C). As shown in FIG. 4, the phase difference Δθ is given by:

$$\Delta\theta = |(\theta IMk + \theta FMj + \theta IMj + \theta FMk)/2 - \theta kj| \text{ and } \Delta\theta$$

ranges from 0 to π.

Figure 5:
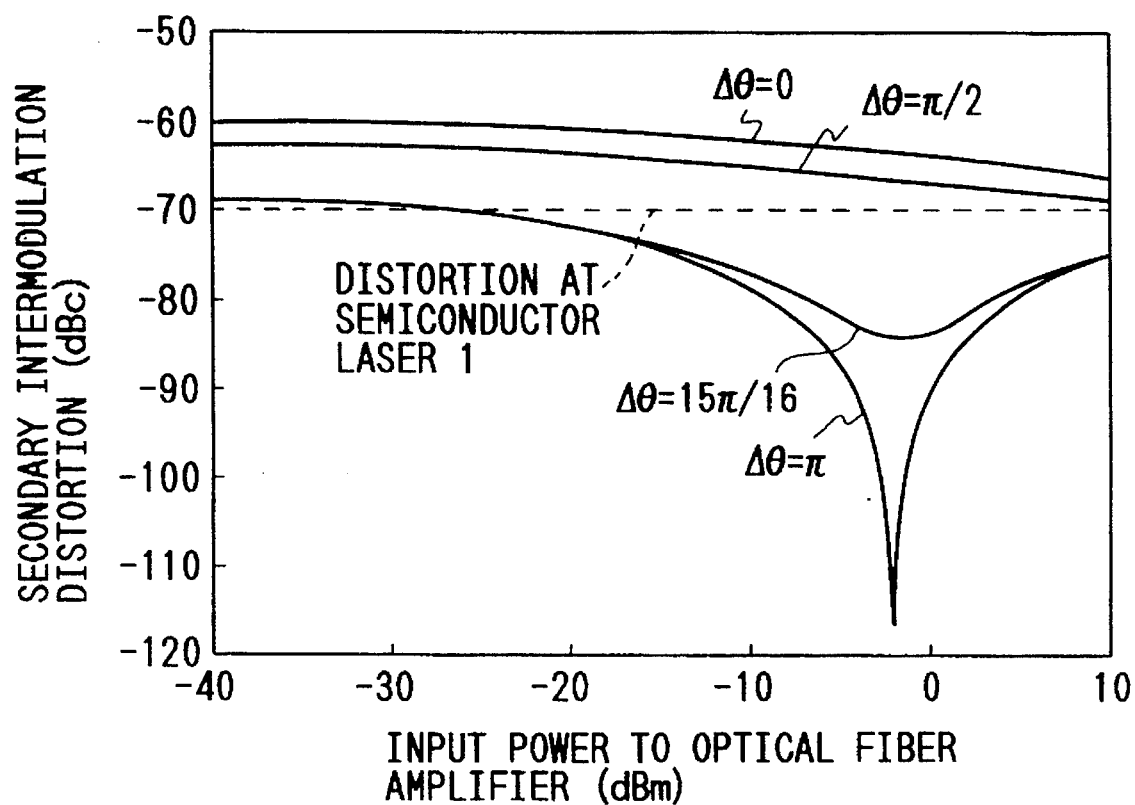
FIG. 5 is a graph of the first embodiment for showing an input power dependency of the secondary intermodulation distortion in the optical fiber amplifier when Δθ is taken as a parameter.

FIG. 5 is a graph of the first embodiment for showing an input power dependency of the secondary intermodulation distortion in the optical fiber amplifier when Δθ is taken as a parameter when a modulation index of the semiconductor laser is 5, the secondary intermodulation distortion level is −70 dBc, and the maximum frequency shift of the frequency modulation is 800 MHz. Moreover, it is assumed that a differential cross section $(1/\sigma s)(d\sigma s/dv) = 0.009\%/GHz$ assuming an optical cross section of the rare-earth doped fiber is σs. Here, there is the wavelength dependency in gain because the differential cross section is not zero. When Δθ=0 and Δθ=π/2, the distortion is increased by the transmission of the laser light signal through the optical fiber amplifier. However, when Δθ=15 π/16 and Δθ= π the distortion is reduced under that of the semiconductor laser.

Figure 6:
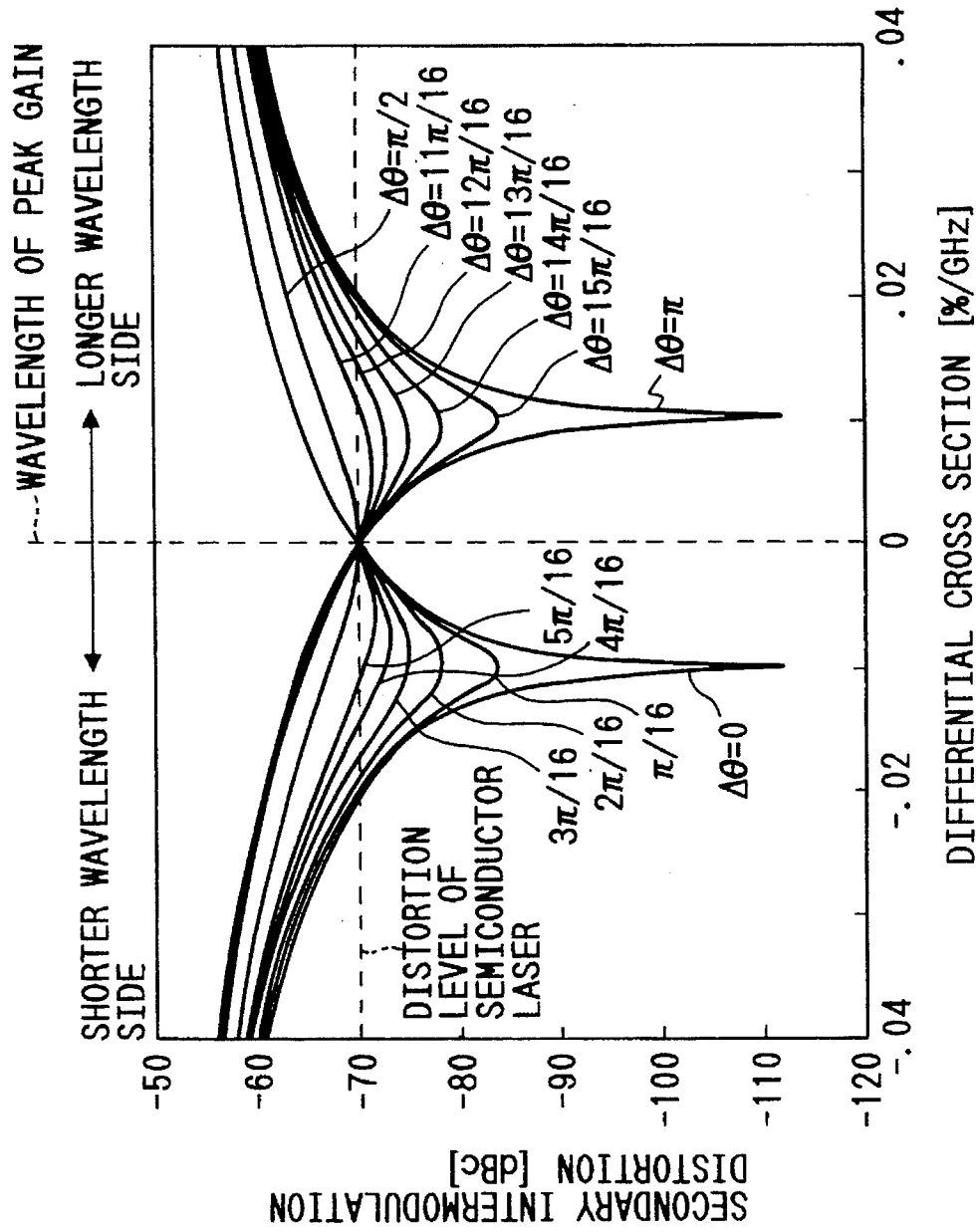
FIG. 6 shows a differential cross section dependency of the secondary intermodulation distortion of the first embodiment.

FIG. 6 shows a differential cross section dependency of the secondary intermodulation distortion after transmission of the optical fiber amplifier 2. It is assumed that the input power to the optical fiber amplifier 2 is OdB and other conditions are the same as the example of FIG. 5. Here, (1/σs) (dσs/dv)=0 corresponds to a peak wavelength of the gain of the optical fiber amplifier 2. The negative region corresponds to the short wavelength side of the gain peak and the positive region corresponds to the longer wavelength side. As shown in FIG. 6, it is evident that the distortion is reduced in a range Δθ<π/2 when the oscillation wavelength of the semiconductor laser 1 lies on the side of shorter wavelength side than the gain peak wavelength of the optical fiber amplifier. When the oscillation wavelength of the semiconductor laser lies on the side of longer wavelength side than the gain peak wavelength of the optical fiber amplifier 2, the distortion is reduced in a range π/2<Δθ≤π. More specifically, on the side of longer wavelength in FIG. 6, the distortion is not improved when Δθ=π/2. When Δθ=11 π/16, there is an improvement in the distortion. When Δθ=12 π/16, the distortion:is improved further. When Δ θ=13 π/16, the distortion is improved favorable. When Δ θ=14 π/16, the distortion is improved more favorably. When Δθ=15 π/16, the distortion is improved considerably. When Δθ=π, the distortion is most improved. Similarly, on the side of shortest wavelength in FIG. 6, the distortion is improved. That is, on the side of shorter wavelength in FIG. 6, the distortion is not so improved when Δθ=π/2. When Δθ=5 π/16, there is an improvement in the distortion. When Δθ=3 π/16, the distortion is improved further. When Δθ=3 π/16, the distortion is improved favorably. When Δθ=2 π/16, the distortion is improved more favorably. When Δθ=1 π/16, the distortion is improved considerably. When Δθ=0, the distortion is most improved.

In the first and second examples of the DFB lasers used in this embodiment, Δθ=0.94 π(FIG. 2A) and Δθ=π (FIG. 2B) respectively. Solid lines in FIGS. 2A and 2B show analysis obtained by calculation which agree with the experimental results mentioned above. Moreover, a semiconductor laser having an oscillation wavelength of 1561 nm and Δθ=0 is used. The distortion is also reduced by transmitting through the optical fiber amplifier 2, so that the analog optical transmission having a preferable distortion characteristic is provided.

Figure 7:
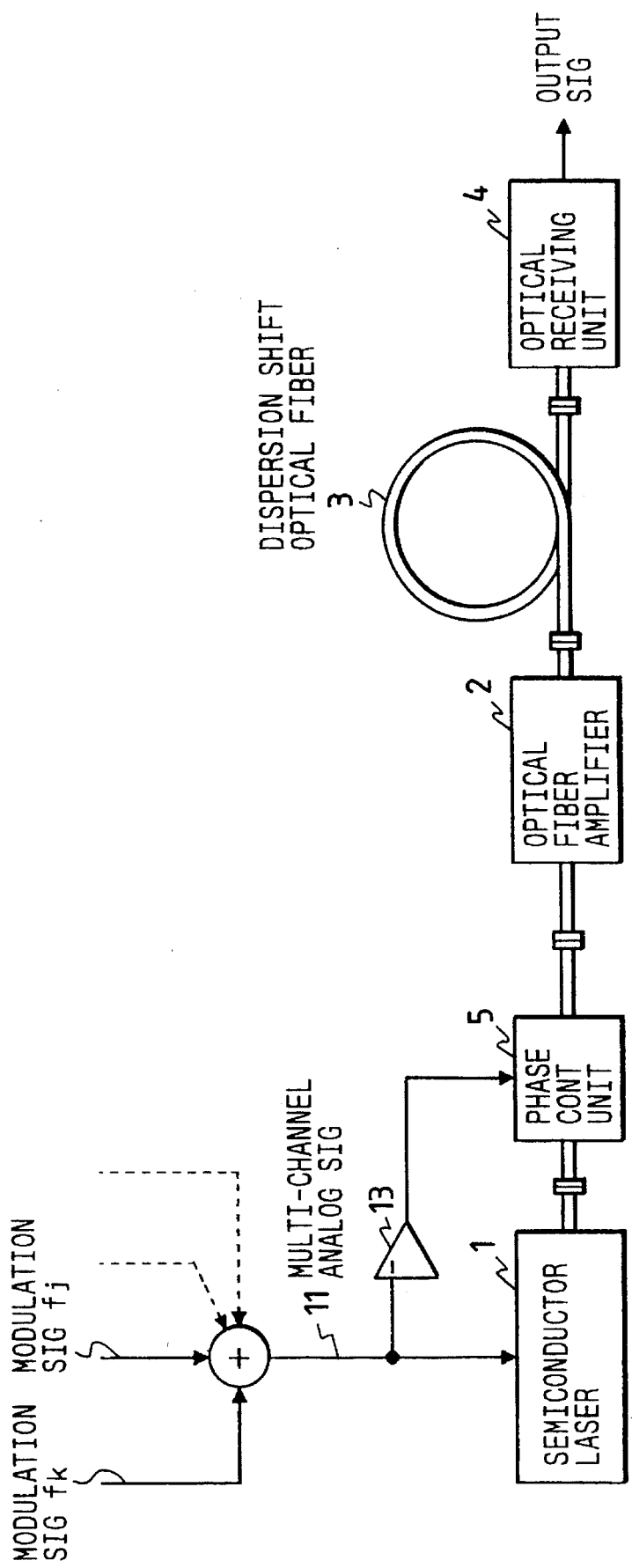
FIG. 7 is a block diagram of a second embodiment of an analog optical transmission system.
Figure 8:
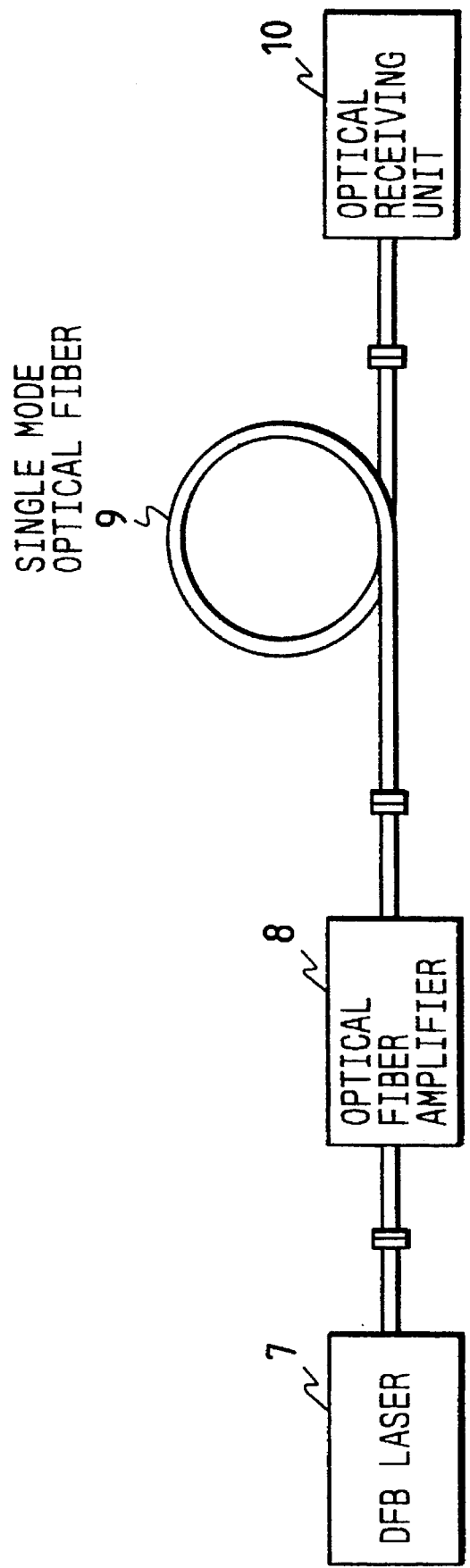
FIG. 8 is a block diagram of a prior art analog optical transmission system.
Figure 9A:
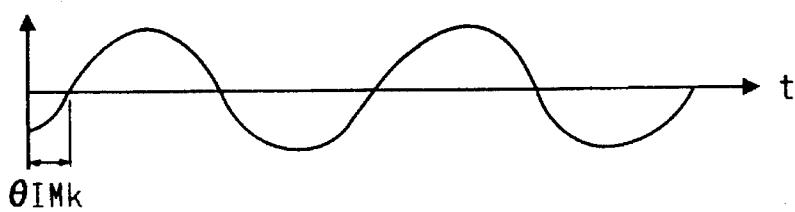
FIGS. 9A to 9E show phase relations among respective components outputted at the phase control unit of the second embodiment.
Figure 9B:
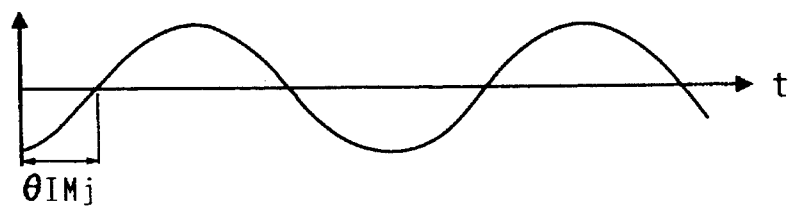
Figure 9C:
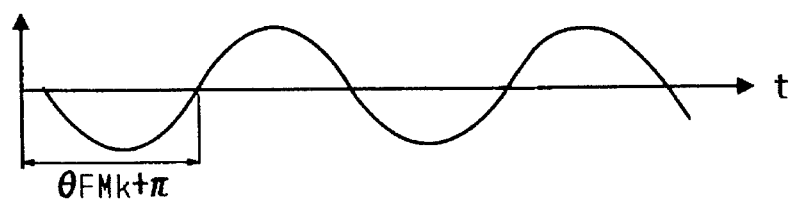
Figure 9D:
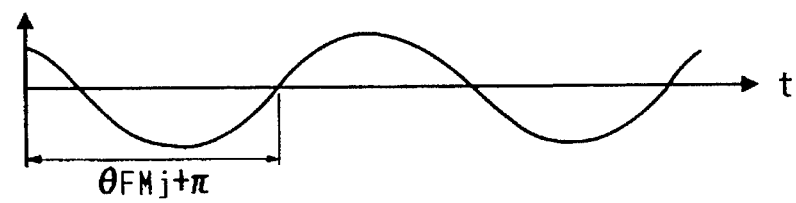
Figure 9E:
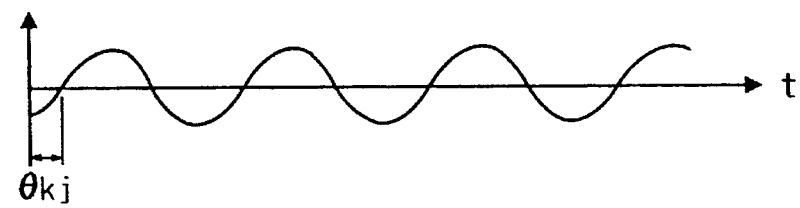

Hereinbelow will be described a second embodiment of this invention with reference to FIG. 7. FIG. 7 is a block diagram of the second embodiment of an analog optical transmission system. The basic structure is the same as that of the first embodiment. There is a difference that a phase control unit 5 is inserted between the semiconductor laser 1 and the optical fiber amplifier 2. In this case, the second example of the semiconductor laser having the wavelength of 1546 nm FIG. 2B) is used for the semiconductor laser 1. The distortion characteristic is improved with the phase control unit 5. The phase control unit 5 changes the phases of the intensity modulation component, frequency modulation component, and distortion component, so that the distortion characteristic is improved. That is, the phase difference Δθ between the distortion component of the optical fiber amplifier 2 and the semiconductor laser 1 is controlled by the phase control unit 5 such that the secondary intermodulation distortion of the semiconductor laser 1 is cancelled with the distortion developed by the interaction between the frequency modulation component and the wavelength dependency of gain of the optical fiber amplifier.

Figure 10:
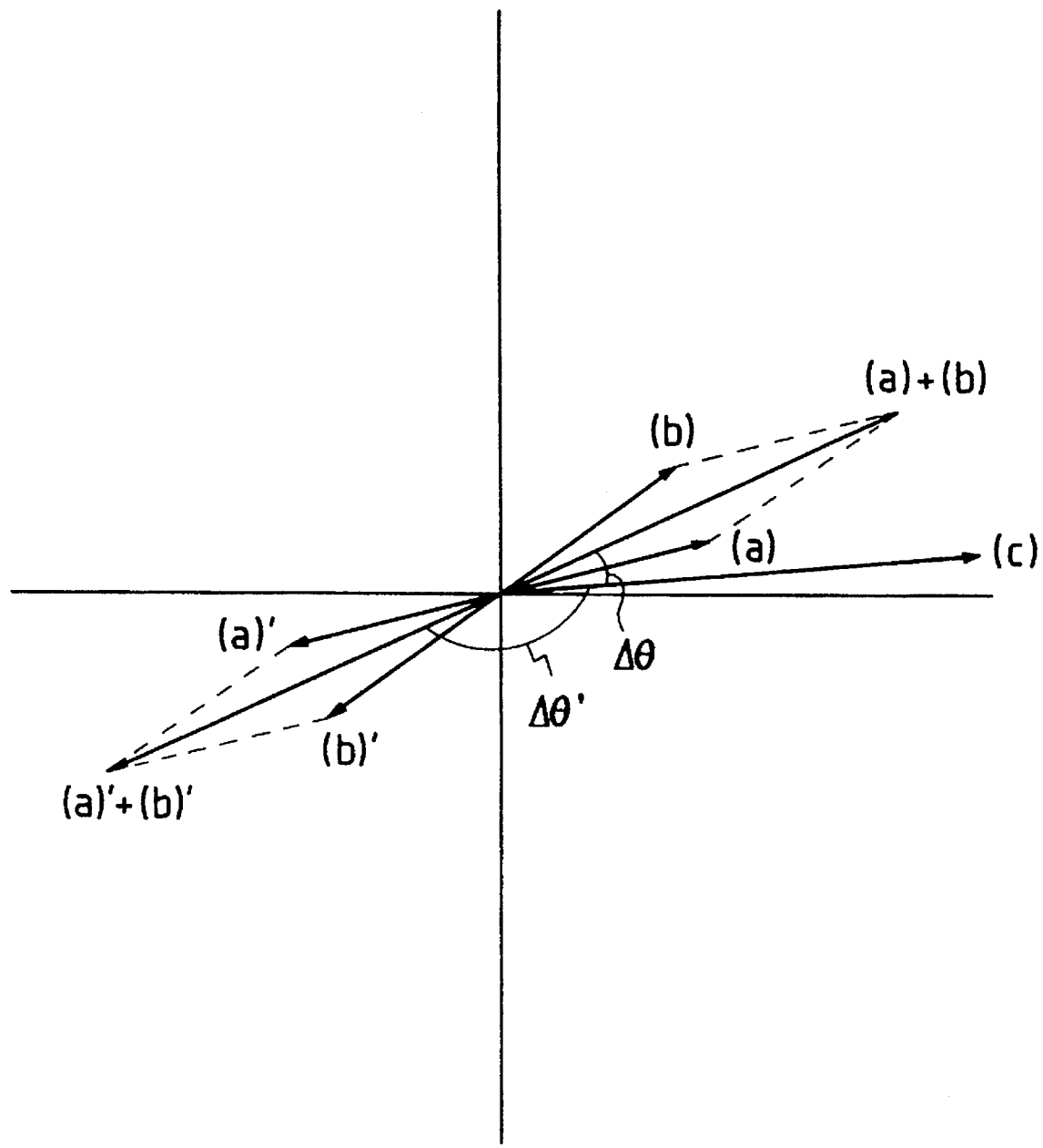
FIG. 10 is a vector diagram showing the phase controlling of the second embodiment.
Figure 11A:
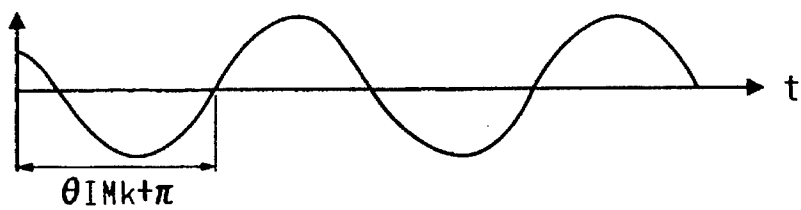
FIGS. 11A to 11E show phase relations among respective components outputted at the phase control unit of the second embodiment.
Figure 11B:
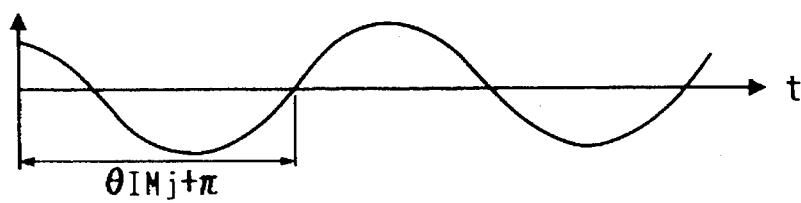
Figure 11C:
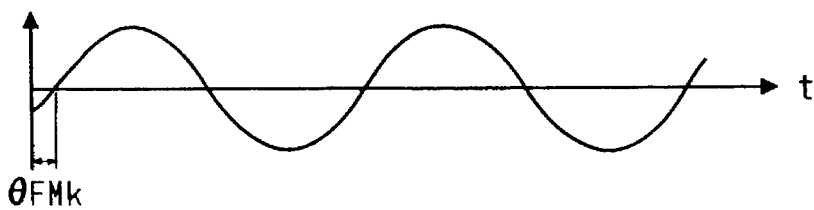
Figure 11D:
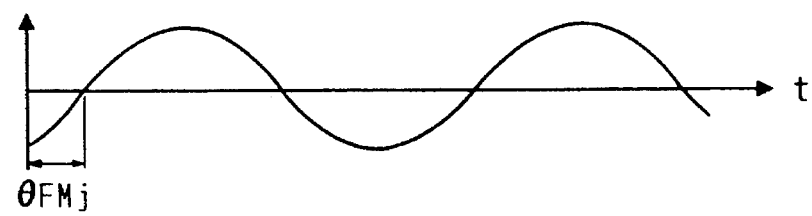
Figure 11E:
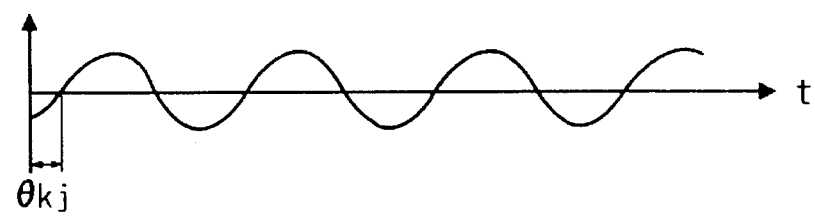

More specifically, a LiNbO$_3$ waveguide type frequency modulator 5a is used as the phase control unit 5. The LiNbO$_3$ waveguide type frequency modulator (phase control unit) 5a changes only phase of frequency modulation components by π. Thee phase modulator 5a modulates the laser light signal from the semiconductor laser 1 with an inverted multi-channel analog signal inverted by an inverting amplifier 13. Therefore, only frequency components outputted at the phase control unit 5a is retarded. FIGS. 9A to 9E show phase relations among respective components outputted at the phase control unit 5a of the second embodiment. In comparison with FIGS. 3A to 3E, it is clear that only frequency modulation components are retarded by π. FIG. 10 is a vector diagram of the second embodiment showing this phase controlling. As mentioned above, the secondary intermodulation distortion component of frequencies of fk+fj developed in the optical fiber amplifier 2 is a sum of distortions of:

(a) the product of the intensity modulation component of the frequency fk and the frequency modulation component of the frequency fj; and (b) the product of the intensity modulation component of the frequency fj and the frequency modulation component of the frequency fk. Here, vectors (a),(b), and (a)+(b) are represented as output component of the optical fiber amplifier 2 when the laser light signal would be directly inputted to the optical fiber amplifier 2. On the other hand, vectors (a)',(b)', and (a)'+(b)' are represented as output components of the optical fiber amplifier when the laser light signal is inputted to the optical fiber amplifier 2 through the phase control unit 5a. As shown in FIG. 10, when the laser light signal is inputted to the optical fiber amplifier 2 directly without the phase control unit 5a when Δθ<π/2 wherein Δθ is a phase difference between the distortion component (c) in the laser light of the semiconductor laser 1 and distortion components (a)+(b), a total distortion is improved as follows:

When the phase control unit 5a is superimposed between the semiconductor laser 1 and the optical fiber amplifier 2, the distortion components developed in the optical fiber 2 are retarded by π as shown in FIG. 10. Therefore, the phase difference Δθ'>π/2. As described in the first embodiment, in this condition the total distortion is reduced.

When a LiNbO$_3$ waveguide type Mach-Zehnder interferometric intensity modulator (phase control unit) 5b is used as the phase control unit 5. The phase control unit 5a changes only phase of intensity modulation component by π. FIGS. 11A to 11E show phase relations among respective components outputted at the phase control unit 5b of the second embodiment. In comparison with FIGS. 3A to 3E, it is clear that only intensity modulation components are retard by π.

Similarly the phase difference is changed from Δθ <π/2 to Δθ'>π/2. Therefore, the total distortion is improved.

In the above-mentioned embodiment, Er (erbium) as rare earth element is used for doping the optical fiber 2a of the optical fiber amplifies 2 and the oscillation wavelength of the semiconductor laser 1 is 1550 nm band. On the other hand, an experiment is made using Pr (praseodymium) for doping the optical fiber 2a of the optical fiber amplifier 2 and a semiconductor laser having an oscillation wavelength of 1300 nm band. In this system, also the distortion is reduced similarly.

As mentioned, in the analog optical transmission system, the secondary intermodulation distortion is cancelled with the distortion developed by the interaction between the frequency modulation component and the wavelength dependency of gain of the optical fiber amplifier 2.

What is claimed is:

1. An analog transmission system for transmitting a multi-channel analog signal including plural carrier signals having different frequencies, comprising:
a laser unit responsive to the multi-channel analog signal for emitting a laser light signal having a predetermined oscillation frequency W1 and including intensity-modulated components and frequency-modulated components modulated by said multi-channel analog signal and a distortion component; an optical fiber amplifier for amplifying the laser light signal and generating a secondary intermodulation distortion component from said intensity-modulated components and said frequency modulated components; an optical fiber for transmitting the amplified laser light signal; and an optical receiver for receiving the transmitted laser light signal and for converting the received laser light signal into an electric signal as an output, wherein said distortion component is cancelled by said secondary intermodulation distortion component.

2. An analog transmission system as claimed in claim 1, wherein said optical fiber amplifier has a peak gain at a wavelength W2, first and second carrier signals of said plural carrier signals have frequencies fk and fj respectively, said laser light signal includes at least a secondary intermodulation distortion component of said frequencies fk and fj, said amplified laser light signal includes intensity-modulation components of said frequencies fk and fj and frequency modulation components of said frequencies fk and fj, phases of said intensity-modulation components of said frequencies fk and fj being $\theta$ IMk and $\theta$ IMj respectively, phases of said frequency modulation components of said frequencies fk and fj being $\theta$ FMk and $\theta$ FMj respectively, a phase of said secondary intermodulation distortion component being $\theta$ kj, wherein $|(\theta \text{ IMk}+\theta \text{ FMj}+\theta \text{ IMj}+\theta \text{ FMk})/2-\theta \text{ ij}|<\pi/2$ when W1<W2.

3. An analog transmission system as claimed in claim 2, wherein $|(\theta \text{IMk}+\theta \text{FMj}+\theta \text{ IMj}+\theta \text{ FMk})/2-\theta \text{kj}|\leq 5\pi/16$.

4. An analog transmission system as claimed in claim 2, wherein said W1 is in 1550 nm band and said optical fiber amplifier has an exciter laser and an amplifying optical fiber for amplifying and transmitting said laser light signal, said amplifying optical fiber being doped with Er to amplify said laser light signal.

5. An analog transmission system as claimed in claim 2, wherein said W1 is in 1300 nm band and said optical fiber amplifier has an exciter laser and an amplifying optical fiber for amplifying and transmitting said laser light signal, said amplifying optical fiber being doped with Pr to amplify said laser light signal.

6. An analog transmission system as claimed in claim 2, wherein said optical fiber comprises a dispersion shifted optical fiber.

7. An analog transmission system as claimed in claim 1, further comprising a phase control means provided between said laser unit and said optical fiber amplifier for changing a phase difference of said secondary distortion component from said intensity-modulation components and frequency modulation components wherein said distortion component is cancelled by said secondary intermodulation distortion component.

8. An analog transmission system as claimed in claim 7, wherein said W1 is in 1550 nm band and said optical fiber amplifier has an exciter laser and an amplifying optical fiber for amplifying and transmitting said laser light signal, said amplifying optical fiber being doped with Er to amplify said laser light signal.

9. An analog transmission system as claimed in claim 7, wherein said W1 is in 1300 nm band and said optical fiber amplifier has an exciter laser and an amplifying optical fiber for amplifying and transmitting said laser light signal, said amplifying optical fiber being doped with Pr to amplify said laser light signal.

10. An analog transmission system as claimed in claim 7, wherein said optical fiber comprises a dispersion shifted optical fiber.

11. An analog transmission system as claimed in claim 1, wherein first and second carrier signals of said plural carrier signal having frequencies fk and fj respectively, said laser light signal including at least a secondary intermodulation distortion component of said frequencies fk and fj, said amplified laser light signal including intensity-modulation components of said frequencies fk and fj and frequency modulation components of said frequencies fk and fj, phases of said intensity-modulation components of said frequencies fk and fj being $\theta$ IMk and $\theta$ IMj respectively, phases of said frequency modulation components of said frequencies fk and fj being $\theta$ FMk and $\theta$ FMj respectively, a phase of said secondary intermodulation distortion component being $\theta$ kj, wherein $\pi/2|$ $(\theta \text{ IMk}+\theta \text{ FMj}+\theta \text{ IMj}+\theta \text{ FMk})/2-\theta \text{ kj}|\leq \pi$ when W1>W2.

12. An analog transmission system as claimed in claim 11, wherein $11\pi/16\leq|(\theta \text{ IMk}+\theta \text{ FMj}+\theta \text{ IMj}+\theta \text{ FMk})/2-\theta \text{ kj}|\leq\pi$.

13. An analog transmission system as claimed in claim 11, wherein said W1 is in 1550 nm band and said optical fiber amplifier has an exciter laser and an amplifying optical fiber for amplifying and transmitting said laser light signal, said amplifying optical fiber being doped with Er to amplify said laser light signal.

14. An analog transmission system as claimed in claim 11, wherein said W1 is in 1300 nm band and said optical fiber amplifier has an exciter laser and an amplifying optical fiber for amplifying and transmitting said laser light signal, said amplifying optical fiber being doped with Pr to amplify said laser light signal.

15. An analog transmission system as claimed in claim 11 wherein said optical fiber comprises a dispersion shifted optical fiber.

16. An analog transmission system as claimed in claim 11, further comprising a phase control means provided between said laser unit and said optical fiber amplifier for changing a phase difference of said secondary distortion component from said intensity-modulation components and frequency modulation components wherein said distortion component is cancelled by said secondary intermodulation distortion component.

17. An analog transmission system as claimed in claim 16, wherein said W1 is in 1550 nm band and said optical fiber amplifier has an exciter laser and an amplifying optical fiber for amplifying and transmitting said laser light signal, said amplifying optical fiber being doped with Er to amplify said laser light signal.

18. An analog transmission system as claimed in claim 16, wherein said W1 is in 1300 nm band and said optical fiber amplifier has an exciter laser and an amplifying optical fiber for amplifying and transmitting said laser light signal, said amplifying optical fiber being doped with Pr to amplify said laser light signal.

19. An analog transmission system as claimed in claim 16, wherein said optical fiber comprises a dispersion shifted optical fiber.

20. An analog transmission system for transmitting a multi-channel analog signal including plural carrier signals having different frequencies, comprising: a laser unit responsive to the multi-channel analog signal for emitting laser light signal including intensity-modulated components and frequency-modulated components modulated by the multi-channel analog signal and a distortion component; an optical fiber amplifier for amplifying the laser light signal and generating a secondary intermodulation distortion component from said intensity-modulated components and said frequency modulated components; an optical fiber for transmitting said amplified laser light; and an optical receiver for receiving the transmitted laser light and for converting the received laser light into an electric signal as an output, wherein a distortion characteristic of said laser unit, caused by said distortion component, is compensated by said secondary intermodulation distortion component.

\* \* \* \* \*